United States Patent [19]

Nishikawa et al.

[11] 4,437,179

[45] Mar. 13, 1984

[54] PHONO PICKUP CARTRIDGE

[75] Inventors: Kazuo Nishikawa; Kiyoshi Sato; Hiroyuki Ichino; Keniti Okura, all of Saitama, Japan

[73] Assignee: Pioneer Electronic Corporation, Tokyo, Japan

[21] Appl. No.: 270,462

[22] Filed: Jun. 4, 1981

[30] Foreign Application Priority Data

Jun. 9, 1980 [JP] Japan .................................. 55-76694
Jun. 9, 1980 [JP] Japan .................................. 55-76695

[51] Int. Cl.³ .......................... G11B 3/02; G11B 3/44
[52] U.S. Cl. ..................................... 369/172; 369/135
[58] Field of Search ............... 369/170, 171, 172, 173, 369/135, 136, 139

[56] References Cited

U.S. PATENT DOCUMENTS 3,294,405 12/1966 Pritchard ............................ 369/136
4,009,885 3/1977 Pritchard ............................ 369/172
4,263,483 4/1981 Obata ................................... 369/139

Primary Examiner—Steven L. Stephan
Attorney, Agent, or Firm—Sughrue, Mion, Zinn, Macpeak & Seas

[57] ABSTRACT

A moving coil type phono pickup cartridge in which a stylus unit is very accurately positioned in three dimensions with respect to a cartridge body to thereby closely align a moving coil unit in the stylus unit with a corresponding magnetic unit in the cartridge body. The stylus unit is formed with first through third resilient plates which project from a side of the stylus unit. The cartridge body is formed with corresponding first through third polished positioning surfaces having engagement recesses at the base portions thereof in which are engaged engagement projections formed at ends of the resilient plates. A tab formed on the stylus unit abuts an upper polished surface of the cartridge body.

7 Claims, 4 Drawing Figures

PHONO PICKUP CARTRIDGE

BACKGROUND OF THE INVENTION

The present invention relates to a phono pickup cartridge having an interchangeable stylus unit and a cartridge body. The invention relates more particularly to positioning device which is mounted between the interchangeable stylus unit and the cartridge body for phono pickup cartridges.

In phono pickup cartridges, it is highly desired that a movable induction generating member thereof be disposed accurately at a predetermined position in narrow magnetic gaps formed in a cartridge body. Therefore, a strong and accurate positioning device is required in order to prevent generation of undesired vibration due to resonance or the like.

In order to satisfy the above-described requirement, there has been proposed, for example, a positioning device as described in U.S. Pat. No. 3,761,647. As disclosed in that patent, a stereophonic pickup cartridge is provided with a positioning device between a stylus unit and a pickup cartridge body. The stylus unit has a post-shaped plug having therein a groove while the cartridge body has therein an aperture adapted to receive the post-shaped plug. When the stylus unit is mounted on the cartridge body, the post-shaped plug is inserted into the aperture with the groove of the post-shaped plug engaged with an annular lock ring in the aperture made of elastomeric material to thereby ensure alignment.

However, with such a construction, since the stylus unit is simply engaged with the cartridge body, the post-shaped plug can rotate around its center axis and the stylus unit can be displaced in the axial direction of the cantilever. As a result, the stylus unit must be secured to the cartridge body to prevent deviation from the correct position. This leads to a difficulty in reproducing stereophonic sound, and distortion and resonance problems are present.

SUMMARY OF THE INVENTION

Overcoming these difficulties, the invention provides a phono pickup cartridge including a stylus unit and a cartridge body. The stylus unit has at least three positioning surface members while the cartridge body has at least three corresponding positioning surfaces. The three positioning surface members are in resilient contact with corresponding ones of the positioning surfaces of the cartridge body when the stylus unit is mounted on the cartridge body.

More specifically, the invention provides a phono pickup cartridge including a stylus unit having first, second third resilient plates which project from a side of the cartridge body. The first resilient plate is disposed perpendicularly to a longitudinal axis of a cantilever while the second and third resilient plates confront each other and are disposed parallel to the axis of the cantilever. Front edges and inner surfaces of walls of the second and third resilient plates serve as standard positioning surfaces. The cartridge body has first, second and third positioning surfaces corresponding, respectively, to the first, second and third resilient plates. When the stylus unit is mounted on the cartridge body, the resilient plates are in resilient contact with the corresponding ones of the positioning surfaces so as to secure the stylus unit to the cartridge body at a predetermined position within small tolerances in three dimensions.

BRIEF DESCRIPTION OF THE DRAWINGS

The present invention will be described with reference to the accompanying drawings in which.

DESCRIPTION OF THE PREFERRED EMBODIMENTS

Figure 1:
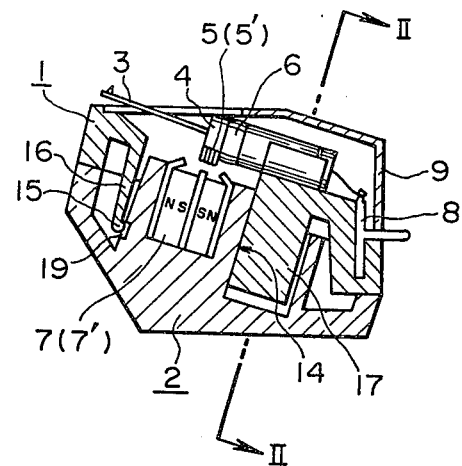
FIG. 1 is a cross-sectional view of a pickup cartridge of the moving coil type to which a positioning device according to the present invention is applied.
Figure 2:
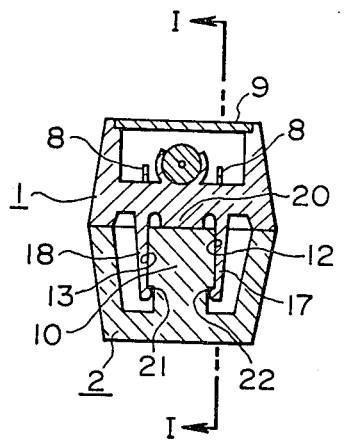
FIG. 2 is a cross-sectional view of the cartridge of FIG. 1 taken along a line II—II.
Figure 3:
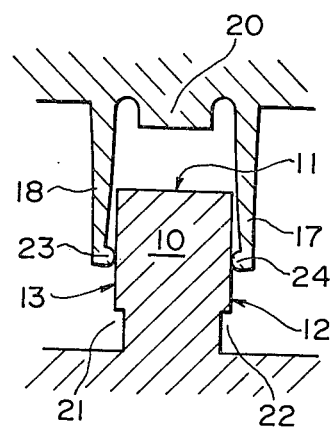
FIG. 3 is an enlarged cross-sectional view of the positioning device shown in FIG. 2 showing relative positiions during a mounting operation.
Figure 4:
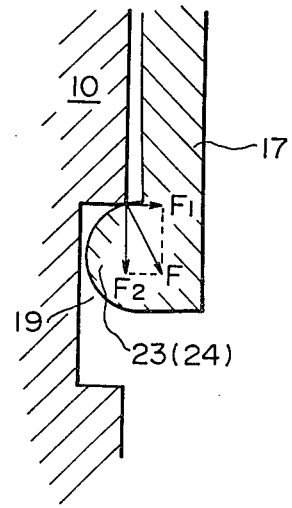
FIG. 4 is an enlarged cross-sectional view of the positioning device shown in FIG. 2 showing a mounted state.

FIGS. 1 and 2 are cross-sectional views of a preferred embodiment of a phono pickup cartridge of the invention, wherein FIG. 1 is a view taken along a line I—I in FIG. 2, which is somewhat offset from the central plane. Specifically, FIG. 1 depicts an induction mechanism on one side channel for reproducing stereophonic sound.

An interchangeable stylus unit 1 includes a vibrating system, output terminals and cartridge body 2. The phono pickup cartridge body 2 is provided with a magnetic structure and associated mounting members for the interchangeable stylus unit 1. In the vibrating system, a cantilever 3 is provided at one end with a stylus for picking up a recorded signal and secured at the other end to a disc-like coil holder 4. The coil holder 4 is provided with a pair of moving coils 5 and 5', corresponding to vibrating directions in compliance with a 45°—45° system of a record groove. The coil holder 4 is swingably supported at a rear side through a cylindrical damper 6 and a suspension wire (not shown) which are well known per se.

Each of two magnetic units 7 or 7' includes a pair of magnets aligned with like poles confronting each other. Each magnet is clamped by three pole pieces to form an E-shaped configuration. The interchangeable stylus unit 1 is mounted on the cartridge body 2, a convergent portion of each magnet unit 7 or 7' confronting a corresponding moving coil 5 or 5'.

Four T-shaped output terminals 8 are secured at the rear side of the interchangeable stylus unit 1. A cover 9 serves to retain the terminals. The pickup output signal is provided on the output terminals 8 which are not permanently mounted to the cartridge body 2 but to the stylus unit 1. To the rear of the magnetic units 7 and 7' is formed a substantially parallele-piped block 10 which is integral with the body 2. An upper polished surface 11 and side polished surfaces 12 and 13 are used for positioning the stylus unit 1. The three surfaces 11 to 13 cooperate with a surface 14 formed on the rear side of the magnetic unit side so as to position the stylus unit at a desired position in three dimensions.

Three resilient plates 16, 17 and 18 each having at ends engagement projections 15, 23 and 24 are formed integrally with the stylus unit 1. The first resilient plate 16 extends substantially vertically to the axis of the cantilever 3 and serves to bias the stylus unit forwardly when mounted on the cartridge body. As shown in FIG. 2, the second the third resilient plates 17 and 18 are formed parallel to each other and clamp the block 10 of the cartridge body with a sufficient pressure to firmly hold the stylus unit in place.

Engagement recesses 19, 21 and 22 are formed adjacent front base portions of the magnetic units 7 and 7' and adjacent base portions of the block 10. When the stylus unit 1 is mounted on the cartridge body 2, the engagement projections 15, 23 and 24 engage with the engagement recesses 19, 21 and 22, respectively.

The front or inner wall surfaces of the second and third resilient plates 17 and 18 are finished to form polished surfaces and are used as reference or standard surfaces. When the stylus unit is mounted on the cartridge body, the plates 17 and 18 are in abutment with the positioning surfaces 12 and 13 of the block 10 and in alignment with the positioning surface 14 on the magnetic unit 1 side.

Between the second and third resilient plates 17 and 18 is formed a tab 20 having polished surface used as a reference or standard surface. When the stylus unit 1 is mounted on the cartridge body 2, the engagement projections 23 and 24 are depressed in the direction of a partial force $F_2$ of a force F applied to the engagement projections 23 and 24 so that the tab 20 is in intimate contact with the positioning surface 11.

Thus, in the pickup cartridge according to the present invention, the standard surfaces formed in the interchangeable stylus unit are in intimate contact with the associated standard surfaces formed on the pickup cartridge body by action of the three resilient plates formed integrally with the interchangeable stylus unit to thereby positively determine the relative position of the stylus unit to the cartridge body. Therefore, the relative position between the stylus unit and cartridge body is maintained constant, and furthermore, the stylus unit and cartridge body are fixedly secured to thereby eliminate undesired vibrations due to resonances and to obtain high quality reproduced sound.

What is claimed is:

1. A phono pickup cartridge comprising: a stylus unit having moving coils, a cantilever coupled to said moving coils, at least three positioning surface members, and a substantially planar tab member substantially perpendicular to said positioning surface members, a first of said positioning surface members being forward of said moving coils and a second and a third of said positioning surface members being behind said moving coils, said first positioning surface being perpendicular to said cantilever, and said second and third positioning surfaces being parallel to said cantilever; and a cartridge body having at least three lateral exterior positioning surfaces and a substantially planar upper surface perpendicular to said lateral surface, said three positioning surface members being in resilient contact with corresponding ones of said positioning surfaces of said cartridge body when said stylus unit is mounted on said cartridge body, a mounting position of said stylus unit on said cartridge body being entirely determined by positions of engagement of said positioning surface members with said corresponding ones of said positioning surfaces and said tab member with said upper surface.

2. The phono pickup cartridge of claim 1 wherein engagement projections are formed at ends of each of said positioning surface members, the engagement projection formed on said first of said positioning surface members extending in a direction perpendicular to a longitudinal axis of said cantilever and the engagement projections formed on said second and third of said positioning surface members extending in directions parallel to said longitudinal axis of said cantilever; and wherein engagement recesses are formed in each of said positioning surfaces for receiving corresponding ones of said engagement projections.

3. A phono pickup cartridge comprising: a stylus unit having moving coils, a cantilever coupled to said moving coils, first, second and third resilient plates which project from a side of said stylus unit, and a substantially planar tab member substantially perpendicular to said resilient plates, one of said resilient plates being forward of said moving coils and two of said resilient plates being behind said moving coils, said first resilient plate being disposed perpendicularly to a longitudinal axis of said cantilever and said second and third resilient plates confronting each other and being disposed parallel to said axis, front edges and inner surfaces of walls of said second and third resilient plates serving as standard positioning surfaces, and said tab member being perpendicular to said first through third resilient plates; and a cartridge body having first, second and third positioning surfaces and a substantially planar upper surface perpendicular to said first through third positioning surfaces, whereby when said stylus unit is mounted on said cartridge body, said resilient plates are in resilient contact with corresponding ones of said first, second and third positioning surfaces and said tab member is in planar contact with said upper surface, and wherein a mounting position of said stylus unit on said cartridge body is entirely determined by positions of engagement of said resilient plates with said corresponding ones of said positioning surfaces and said tab member with said upper surface.

4. The phono pickup cartridge of claim 2 wherein engagement projections are formed at ends of each of said first through third resilient plates, the engagement projection formed on said first resilient plate extending in a direction perpendicular to said longitudinal axis of said cantilever and the engagement projections formed on said second and thrid resilient plates extending in directions parallel to said longitudinal axis of said cantilever; and wherein engagement recesses are formed in each of said positioning surfaces for receiving corresponding ones of said engagement projections.

5. The phono pickup cartridge of claim 1 or 3 wherein said positioning surfaces are polished surfaces.

6. The phono pickup cartridge of claim 1 or 3 further comprising a pair of moving coils mounted on said stylus unit; a permanent magnet unit mounted said cartridge body disposed adjacent said moving coil; and connector terminals rigidly coupled to said stylus unit and electrically coupled to said moving coils.

7. A moving coil type phono pickup cartridge comprising: a cartridge body, said cartridge body including a substantially parallelepiped block formed integrally therewith having an upper polished surface and first, second and third side polished surfaces, said first polished surface being formed in a front portion of said cartridge body and being substantially perpendicular to a longitudinal axis of said cartridge body and said second and third polished surfaces being formed on opposite sides of said parallelepiped block substantially parallel to one another, an engagement recess being formed at a base portion of each of said first through third polished surfaces; a magnet unit disposed in a notch in said cartridge body, said magnet unit including a pair of magnets having two like poles confronting each other; a stylus unit, said stylus unit having first through third resilient plates corresponding in position to said first, second and third polished surfaces, respectively, of said cartridge body when said stylus unit is mounted on said cartridge body, end portions of each of said first, second and third resilient plates having engagement projections formed integrally therewith adapted to partially engage with corresponding ones of said engagement recesses when said stylus unit is mounted on said cartridge body, said stylus unit further having a tap integrally formed therewith adapted to abut said upper polished surface of said cartridge body when said stylus unit is mounted on said cartridge body, a cantilever having a stylus at an outer end thereof, a coil holder and a cylindrical damper for mounting said cantilever at a position opposite said tab, a movable coil unit mounted on said coil holder, and output terminals electrically coupled to said moving coil unit.

* * * * *